United States Patent
Tang et al.

(10) Patent No.: US 11,457,446 B2
(45) Date of Patent: Sep. 27, 2022

(54) METHOD, TERMINAL DEVICE AND COMPUTER STORAGE MEDIUM FOR BEAM SELECTION BASED ON GEOGRAPHICAL POSITIONS OF TERMINAL DEVICES

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/913,335

(22) Filed: Jun. 26, 2020

(65) Prior Publication Data
US 2020/0329468 A1 Oct. 15, 2020

Related U.S. Application Data

(63) Continuation of application No. PCT/CN2017/119868, filed on Dec. 29, 2017.

(51) Int. Cl.
*H04W 72/04* (2009.01)
*H04W 4/02* (2018.01)
*H04W 72/02* (2009.01)

(52) U.S. Cl.
CPC ......... *H04W 72/046* (2013.01); *H04W 4/023* (2013.01); *H04W 72/02* (2013.01)

(58) Field of Classification Search
CPC ..... H04W 4/023; H04W 76/19; H04W 52/42; G01S 1/66; H04B 7/0695; H01Q 21/061
(Continued)

(56) References Cited

U.S. PATENT DOCUMENTS 6,643,526 B1 * 11/2003 Katz .................... H04B 7/0615
342/359
6,788,661 B1 * 9/2004 Ylitalo .................. H04W 52/42
370/320
(Continued)

FOREIGN PATENT DOCUMENTS

CN 101548488 A 9/2009
CN 101572694 A 11/2009
(Continued)

OTHER PUBLICATIONS

Mobile User Hotspot Detection in LTE Networks by Moving Pseudo Pico Cells by Lutz Ewe; Roland Moedinger; Hajo Bakker Published in: European Wireless 2016; 22th European Wireless Conference Jun. 2016 (Year: 2016).*
(Continued)

*Primary Examiner* — William D Cumming
(74) *Attorney, Agent, or Firm* — Ladas & Parry LLP

(57) ABSTRACT

The present disclosure discloses a beam selection method, a terminal device, and a computer storage medium, where the method includes: selecting a first transmission beam for transmitting data between a first terminal device and a second terminal device based on a geographical position of the first terminal device and a geographical position of the second terminal device; and transmitting data to the second terminal device based on the first transmission beam.

7 Claims, 4 Drawing Sheets

(58) Field of Classification Search
USPC .......... 342/372; 455/562.1, 562.2, 101, 275, 455/277.1, 452.2; 370/334, 320; 375/267
See application file for complete search history.

(56) References Cited

U.S. PATENT DOCUMENTS

| | | | | |
|---|---|---|---|---|
| 7,236,759 | B2* | 6/2007 | Cha | H04B 7/0408 455/562.1 |
| 7,310,537 | B2* | 12/2007 | Wichman | H04B 7/0408 455/562.1 |
| 7,697,626 | B2* | 4/2010 | Wang | H04B 7/088 375/267 |
| 9,640,865 | B2* | 5/2017 | Small | H01Q 21/061 |
| 10,608,337 | B2* | 3/2020 | Small | G01S 1/66 |
| 10,838,420 | B2* | 11/2020 | Bansal | G08G 1/0137 |
| 2004/0214606 | A1* | 10/2004 | Wichman | H04B 7/0408 455/562.1 |
| 2005/0221837 | A1* | 10/2005 | Cha | H04B 7/0408 455/452.2 |
| 2006/0120513 | A1* | 6/2006 | Buttner | A61B 6/08 378/206 |
| 2006/0264184 | A1* | 11/2006 | Li | H04B 17/382 455/562.1 |
| 2007/0165736 | A1* | 7/2007 | Wang | H04L 1/0025 375/267 |
| 2009/0073942 | A1 | 3/2009 | Qin et al. | |
| 2013/0207842 | A1* | 8/2013 | Small | H04L 5/0048 342/372 |
| 2017/0041974 | A1 | 2/2017 | Liao et al. | |
| 2017/0194705 | A1* | 7/2017 | Small | G01S 1/66 |
| 2019/0011925 | A1* | 1/2019 | Bansal | G08G 1/0133 |
| 2020/0329468 | A1* | 10/2020 | Tang | H04L 67/52 |

FOREIGN PATENT DOCUMENTS

| | | | | |
|---|---|---|---|---|
| CN | 105991759 A | | 10/2016 | |
| WO | WO-2019062797 A1 | * | 4/2019 | ........... H04W 16/28 |
| WO | WO-2021092939 A1 | * | 5/2021 | |
| WO | WO-2022089279 A1 | * | 5/2022 | |

OTHER PUBLICATIONS

K.-H. Chi, J. Morris Chang and T.-C. Wang, "Enhanced Fast Base Station Switching," in IEEE Transactions on Mobile Computing, vol. 11, No. 11, pp. 1640-1651, Nov. 2012, doi: 10.1109/TMC.2011.208. (Year: 2012).*

S. Jung and S. Baek, "A contention-based initial beam search scheme for mmWave cellular communications," 2017 IEEE 28th Annual International Symposium on Personal, Indoor, and Mobile Radio Communications (PIMRC), 2017, pp. 1-5, doi: 10.1109/PIMRC.2017.8292747. (Year: 2018).*

K. Yoshida and T. Tsujimura, "Tracking Control of the Mobile Terminal in an Active Free-Space Optical Communication System," 2006 SICE-ICASE International Joint Conference, 2006, pp. 369-374, doi: 10.1109/SICE.2006.315792. (Year: 2006).*

The EESR of corresponding European application No. 17936533.3, dated Nov. 3, 2020.

Sim Gek Hong et al:"SG Millimeter-Wave and D2D Symbiosis 60 GHz for Proximity-Based Services". IEEE Wireless Communications, vol. 24, No. 4, Aug. 31, 2017(Aug. 31, 2017), pp. 140-145, xp011659543.

International Search Repor(ISR) dated Sep. 21, 2018 for Application No. PCT/CN2017/119868.

The first Office Action of corresponding European application No. 17936533.3, dated Jun. 16, 2021.

* cited by examiner

1012 selecting, among the N transmission beams, a transmission beam having a
minimum angle from the reference connection line as the first transmission beam
based on the reference connection line ⟵ 1013

FIG. 1C

1012 selecting, among the N transmission beams, M transmission beams whose
angles from the reference connection line are smaller than a preset angular
threshold based on the reference connection line; and selecting, among the M
transmission beams, a transmission beam with optimal quality as the first
transmission beam, where M is an integer lower than or equal to N ⟵ 1014

FIG. 1D

1012 selecting, among the N transmission beams, M transmission beams whose
angles from the reference connection line are smaller than a preset angular
threshold based on the reference connection line; and selecting, among the M
transmission beams, a transmission beam as the first transmission beam by polling
in sequence at preset time intervals ⟵ 1015

FIG. 1E

METHOD, TERMINAL DEVICE AND COMPUTER STORAGE MEDIUM FOR BEAM SELECTION BASED ON GEOGRAPHICAL POSITIONS OF TERMINAL DEVICES

CROSS-REFERENCE TO RELATED APPLICATIONS

This application is a continuation of International Application No. PCT/CN2017/119868 filed on Dec. 29, 2017, the content of which is incorporated herein by reference in its entirety.

TECHNICAL FIELD

The present disclosure relates to the field of information processing technology and, in particular, to a beam selection method, a terminal device, and a computer storage medium.

BACKGROUND

A vehicle-to-everything system belongs to a sidelink (SL: Sidelink) transmission technology based on LTE-D2D. Unlike traditional LTE systems, where communication data is received or transmitted via a base station, the vehicle-to-everything system uses a terminal-to-terminal direct communication method, and thus has higher spectrum efficiency and shorter transmission latency. The vehicle-to-everything (V2X) technology has been standardized in 3GPP Rel-14, and two transmission modes have been defined, namely Mode 3 and Mode 4.

In the V2X system, because the terminals are moving at high speed and the positions are also dynamically changing, an optimal beam selected and fed back by the receiver may have failed by the time of the next transmission. Moreover, since the resources required by the terminal to transmit data are obtained through contention, the receiver will have to contend for resources when providing feedback regarding the optimal beam, which will lead to uncertainty in the feedback latency, causing the optimal beam index to fail.

SUMMARY

To solve the above technical problems, embodiments of the present disclosure provide a beam selection method, a terminal device, and a computer storage medium.

An embodiment of the present disclosure provides a beam selection method, which is applied to a first terminal device, including:

selecting a first transmission beam for transmitting data between a first terminal device and a second terminal device based on a geographical position of the first terminal device and a geographical position of the second terminal device; and transmitting data to the second terminal device based on the first transmission beam.

An embodiment of the present disclosure provides a terminal device, including:

a processing unit, configured to select a first transmission beam for transmitting data to a second terminal device based on a geographical position of the processing unit and a geographical position of the second terminal device; and a communication unit, configured to transmit data to the second terminal device based on the first transmission beam.

An embodiment of the present disclosure provides a terminal device, including a processor, and a memory for storing a computer program capable of being run by the processor, where the processor is configured to, when running the computer program, execute the steps of the foregoing method.

An embodiment of the present disclosure provides a computer storage medium, storing thereon computer-executable instructions which, when being executed, implement the steps of the foregoing method.

According to the technical solutions of the embodiments of the present disclosure, a transmission beam between the first terminal device and the second terminal device can be selected in combination with the geographical positions of the terminal devices to transmit data to the second terminal device through the selected transmission beam. Thus, the optimal transmission beam is directly determined using the geographical positions of the transmitting end and the receiving end, thereby avoiding a problem caused by the mobility of the terminal, in which a beam selected in a previous state becomes inappropriate for a state of the terminal after the movement due to the terminal's movement. Moreover, information of the beam can be updated in real time based on update of the positions of the transmitting end and the receiving end.

BRIEF DESCRIPTION OF THE DRAWINGS

FIGS. 1C-1E are flowcharts illustrating beam selection methods provided in yet another embodiments of the present disclosure;

DESCRIPTION OF EMBODIMENTS

In order to understand the features and technical contents of the embodiments of the present disclosure in more detail, the implementations of the embodiments of the present disclosure will be described in detail below with reference to the accompanying drawings. The accompanying drawings are for reference only and are not intended to limit the embodiments of the present disclosure.

Embodiment 1

Figure 1A:
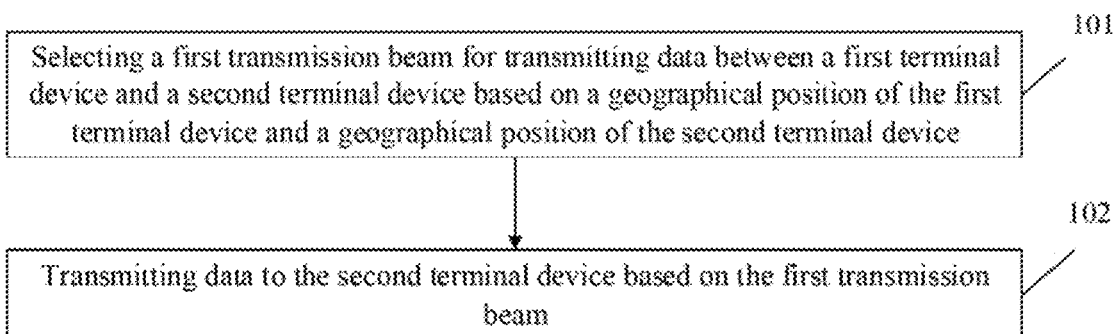
FIG. 1A is a flowchart illustrating a beam selection method provided in an embodiment of the present disclosure.

An embodiment of the present disclosure provides a beam selection method, which is applied to a first terminal device. As shown in FIG. 1A, the method includes:

Step 101: select a first transmission beam for transmitting data between a first terminal device and a second terminal device based on a geographical position of the first terminal device and a geographical position of the second terminal device;

Step 102: transmit data to the second terminal device based on the first transmission beam.

Figure 1B:
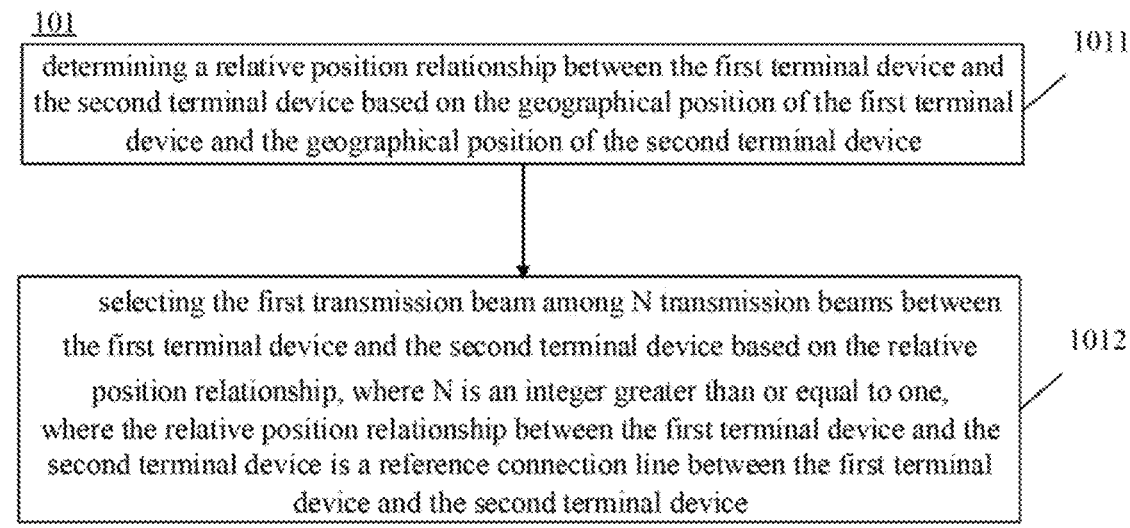
FIG. 1B is a flowchart illustrating a beam selection method provided in an another embodiment of the present disclosure.

Specifically, in the above Step 101 as shown in FIG. 1B, the method further includes: Step 1011, determining a relative position relationship between the first terminal device and the second terminal device based on the geographical position of the first terminal device and the geographical position of the second terminal device; and Step 1012, selecting a first transmission beam among N transmission beams between the first terminal device and the second terminal device based on the relative position relationship, where N is an integer greater than or equal to one.

Specifically, the relative position relationship between the first terminal device and the second terminal device is a reference connection line between the first terminal device and the second terminal device.

Figure 2:
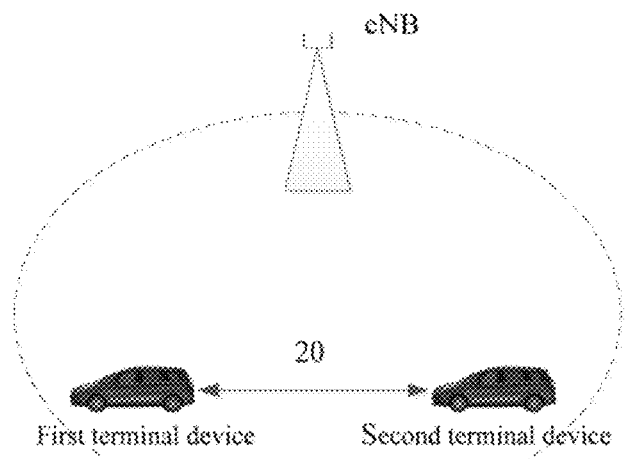
FIG. 2 is a schematic illustration 1 of a processing scenario of an embodiment of the present disclosure.

For example, referring to FIG. 2, two terminal devices, namely a first terminal device and a second terminal device, have a relative position relationship which can be represented by a reference connection line 20 between the two devices.

The modes of selecting a first transmission beam among N transmission beams between the first terminal device and the second terminal device based on the relative position relationship may include the following three modes, i.e., mode 1, mode 2, and mode 3 corresponding to Step 1013, Step 1014, and Step 1015 respectively as shown in FIGS. 1C-1E):

Mode 1:

Select, among the N transmission beams, a transmission beam having a minimum angle from the reference connection line as the first transmission beam based on the reference connection line.

Figure 3:
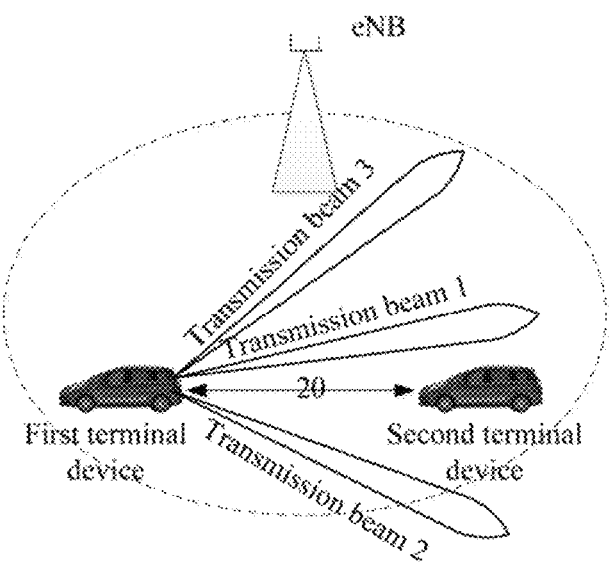
FIG. 3 is a schematic illustration 2 of a processing scenario of an embodiment of the present disclosure.

For example, referring to FIG. 3, there are three transmission beams between the first terminal device and the second terminal device, where the angle between the transmission beam 1 and the reference connection line 20 is the smallest. Hence, the transmission beam 1 may be selected to be the first transmission beam.

Mode 2:

Select, among the N transmission beams, M transmission beams whose angles from the reference connection line are smaller than a preset angular threshold based on the reference connection line; and select, among the M transmission beams, a transmission beam with optimal quality as a first transmission beam.

The preset angular threshold is preset or network-configured.

The optimal quality may be understood as a condition fulfilling at least one of the following: minimum load, maximum power, minimum interference, maximum signal-to-noise ratio, etc. It should be understood that there may be other conditions, which are not exhaustive in this embodiment.

Mode 3:

Select, among the N transmission beams, M transmission beams whose angles from the reference connection line are smaller than a preset angular threshold based on the reference connection line; and select, among the M transmission beams, a transmission beam as a first transmission beam by polling in sequence at preset time intervals.

In this mode, all of the M transmission beams are selected beams, albeit only one of them serves as the first transmission beam at any one time.

For example, two out of five transmission beams are selected, whose angles from the reference connection line are smaller than a preset angular threshold, and then the two transmission beams are polled to be the first transmission beam individually for a time period.

Further, the time periods that each of the selected transmission beams acts as the first transmission beam may be the same or different, and may be preset in advance. For example, a preset parameter may be a corresponding time period preset in advance when a certain transmission beam is used as the first transmission beam; or, a preset parameter may be a fixed time period for each transmission beam acting as the first transmission beam in a preset polling mode.

Further, as to which of the M transmission beams should be selected first and which should be selected next, the selection can be made randomly, or according to sequence sorted based on the identifiers of the beams, or according to sequence sorted from the best to the worst based on the qualities of the beams. The selection manners are not exhaustive in this embodiment.

Before selecting the first transmission beam for transmitting data between the first terminal device and the second terminal device based on the geographical position of the first terminal device and the geographical position of the second terminal device, the method also includes:

obtain the geographical position of the second terminal device from broadcast information transmitted by the second terminal device.

That is, for the purpose of data transmission from the transmitting end to the receiving end, the optimal beam is the one pointing from the transmitting end to the receiving end. Hence, the optimal transmission beam can be quickly determined using the geographical position information of the transmitting end and the receiving end. In a vehicle-to-everything system, all vehicles periodically broadcast their own position information, such as a cooperative awareness message (CAM). Since this information is transmitted in the manner of omni-directional broadcasting, the surrounding vehicles can learn about the position information of other vehicles by detecting the CAM messages, and thus determine the optimal transmission beam with a given receiving end.

It should be noted that the embodiments laid out in the present disclosure are not only applicable to vehicle-to-vehicle communication, but also to vehicle-to-everything (V2X) communication and other device-to-device (D2D: device to device) communication systems.

It can be seen that, by adopting the foregoing solutions, a transmission beam between the first terminal device and the second terminal device can be selected in combination with the geographical positions of the terminal devices to transmit data to the second terminal device through the selected transmission beam. Thus, the optimal transmission beam is directly determined using the geographical positions of the transmitting end and the receiving end, thereby avoiding a problem caused by the mobility of the terminal, in which a beam selected in a previous state becomes inappropriate for a state of the terminal alter the movement due to the terminal's movement. Moreover, information of the beam can be updated in real time based on update of the positions of the transmitting end and the receiving end.

Embodiment 2

Figure 4:
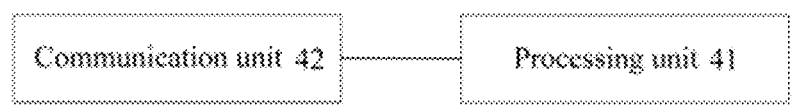
FIG. 4 is a schematic structural diagram of a terminal device according to an embodiment of the present disclosure.

An embodiment of the present disclosure provides a terminal device which, as shown in FIG. 4, includes:

a processing unit 41, configured to select a first transmission beam for transmitting data to a second terminal device based on its own geographical position and a geographical position of the second terminal device; and a communication unit 42, configured to transmit data to the second terminal device based on the first transmission beam.

Specifically, the processing unit 41 determines a relative position relationship between the first terminal device and the second terminal device based on the geographical position of the first terminal device and the geographical position of the second terminal device, and selects a first transmission beam among N transmission beams between the first terminal device and the second terminal device based on the relative position relationship, where N is an integer greater than or equal to one.

Specifically, the relative position relationship between the first terminal device and the second terminal device is a reference connection line between the first terminal device and the second terminal device.

For example, referring to FIG. 2, two terminal devices, namely a first terminal device and a second terminal device, have a relative position relationship which can be represented by a reference connection line 20 between the two devices.

The modes of selecting a first transmission beam among N transmission beams between the first terminal device and the second terminal device based on the relative position relationship may include:

Mode 1:

The processing unit 41 selects, among the N transmission beams, a transmission beam having a minimum angle from the reference connection line as the first transmission beam based on the reference connection line.

For example, referring to FIG. 3, there are three transmission beams between the first terminal device and the second terminal device, where the angle between the transmission beam 1 and the reference connection line 20 is the smallest. Hence, the transmission beam 1 may be selected to be the first transmission beam.

Mode 2:

The processing unit 41 selects, among the N transmission beams, M transmission beams whose angles from the reference connection line are smaller than a preset angular threshold based on the reference connection line; and selects, among the M transmission beams, a transmission beam with optimal quality as a first transmission beam.

The preset angular threshold is preset or network-configured.

The optimal quality may be understood as a condition fulfilling at least one of the following: minimum load, maximum power, minimum interference, maximum signal-to-noise ratio, etc. It should be understood that there may be other conditions, which are not exhaustive in this embodiment.

Mode 3:

The processing unit 41 selects, among the N transmission beams, M transmission beams whose angles from the reference connection line are smaller than a preset angular threshold based on the reference connection line; and selects, among the M transmission beams, a transmission beam as a first transmission beam by polling in sequence at preset time intervals.

In this mode, all of the M transmission beams are selected beams, albeit only one of them serves as the first transmission beam at any one time.

For example, two out of five transmission beams are selected, whose angles from the reference connection line are smaller than a preset angular threshold, and then the two transmission beams are polled to be the first transmission beam individually for a time period.

Further, the time periods that each of the selected transmission beams acts as the first transmission beam may be the same or different, and may be preset in advance. For example, a preset parameter may be a corresponding time period preset in advance when a certain transmission beam is used as the first transmission beam; or, a preset parameter may be a fixed time period for each transmission beam acting as the first transmission beam in a preset polling mode.

Further, as to which of the M transmission beams should be selected first and which should be selected next, the selection can be made randomly, or according to sequence sorted based on the identifiers of the beams, or according to sequence sorted from the best to the worst based on the qualities of the beams. The selection manners are not exhaustive in this embodiment.

Before selecting the first transmission beam for transmitting data between the first terminal device and the second terminal device based on the geographical position of the first terminal device and the geographical position of the second terminal device, the processing unit 41 obtains the geographical position of the second terminal device from broadcast information transmitted by the second terminal device.

That is, for the purpose of data transmission from the transmitting end to the receiving end, the optimal beam is the one pointing from the transmitting end to the receiving end. Hence, the optimal transmission beam can be quickly determined using the geographical position information of the transmitting end and the receiving end. In a vehicle-to-everything system, all vehicles periodically broadcast their own position information, such as a CAM message. Since this information is transmitted in the manner of omnidirectional broadcasting, the surrounding vehicles can learn about the position information of other vehicles by detecting the CAM messages, and thus determine the optimal transmission beam with a given receiving end.

It can be seen that, by adopting the foregoing solutions, a transmission beam between the first terminal device and the second terminal device can be selected in combination with the geographical positions of the terminal devices to transmit data to the second terminal device through the selected transmission beam. Thus, the optimal transmission beam is directly determined using the geographical positions of the transmitting end and the receiving end, thereby avoiding a problem caused by the mobility of the terminal, in which a beam selected in a previous state becomes inappropriate for a state of the terminal after the movement due to the terminal's movement. Moreover, information of the beam can be updated in real time based on update of the positions of the transmitting end and the receiving end.

Figure 5:
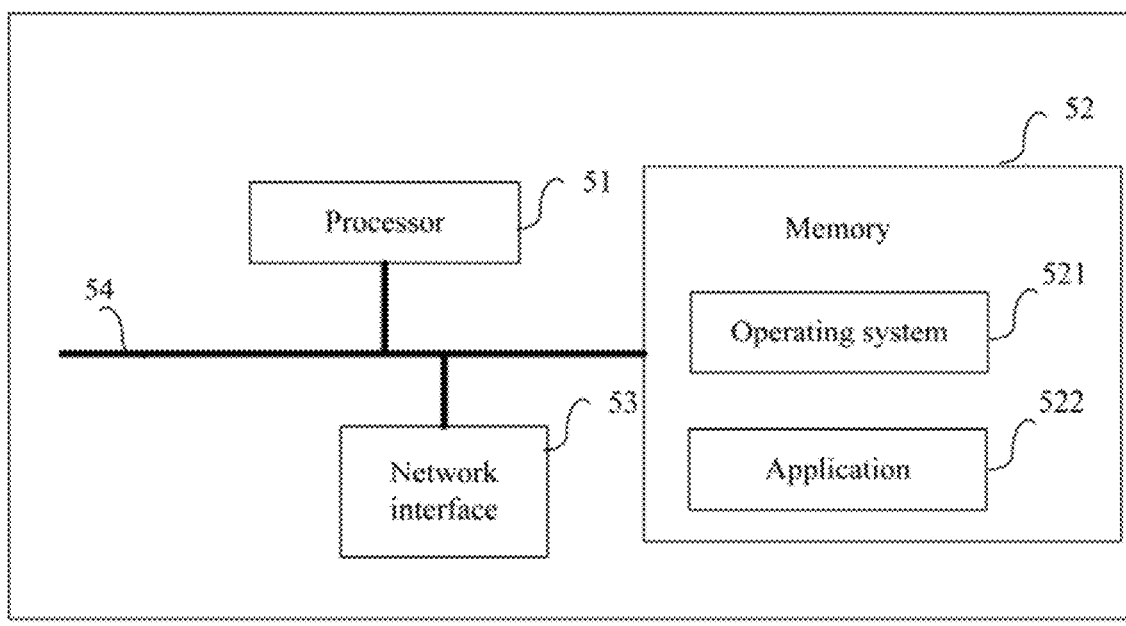
FIG. 5 is a schematic diagram of a hardware architecture according to an embodiment of the present disclosure.

An embodiment of the present disclosure also provides a hardware architecture of a terminal device which, as shown in FIG. 5, includes: at least one processor 51, a memory 52, and at least one network interface 53. The various components are coupled together via a bus system 54. It can be understood that the bus system 54 is used to implement connection and communication between these components. The bus system 54 includes, in addition to a data bus, a power bus, a control bus, and a status signal bus. However, these buses are identified as the bus system 54 in FIG. 5, for the sake of clarity.

It can be understood that the memory 52 in the embodiments of the present disclosure may be a volatile memory or a non-volatile memory, or may include both volatile and non-volatile memories.

In some implementations, the memory 52 stores the following elements, executable modules or data structures, or subsets or extended sets thereof:

operating system 521 and application 522.

The processor 51 is configured to be capable of processing the method steps of the Embodiment 1, which will not be repeated herein.

An embodiment of the present disclosure provides a computer storage medium, storing thereon computer-executable instructions which, when being executed, implement the method steps of the Embodiment 1.

When implemented in the form of a software functional module and marketed or used as an independent product, the device in the above embodiment of the present disclosure may also be stored in a computer-readable storage medium. Based on such understanding, the essence, or the part of the technical solution of the embodiment of the present application contributing to prior art, may manifest in the form of software product. Such a computer software product may be stored in a storage medium and may include instructions for causing a computing device (which may be a personal computer, a server, or a network device, etc.) to implement some or all of the steps in the methods of the various embodiments of the present disclosure. The storage medium includes: a USB thumb, a portable hard disk, a read-only memory (ROM), a magnetic disk, or an optical disk, and the like, which may store program codes. Thus, the embodiments of the present disclosure are not limited to any specific combination of hardware and software.

Accordingly, an embodiment of the present disclosure also provides a computer storage medium, storing therein a computer program which is configured to execute the method of the embodiment of the present disclosure.

Although preferred embodiments of the present disclosure have been disclosed for illustrative purposes, those skilled in the art will appreciate that various modifications, additions, and substitutions are also possible, and therefore, the scope of the present disclosure should not be limited to the above embodiments.

What is claimed is:

1. A beam selection method, which is applied to a first terminal device, comprising:

selecting a first transmission beam for transmitting data between the first terminal device and the second terminal device based on a geographical position of the first terminal device and a geographical position of the second terminal device; and transmitting data to the second terminal device based on the first transmission beam;

wherein the selecting a first transmission beam for transmitting data between the first terminal device and the second terminal device based on a geographical position of the first terminal device and a geographical position of the second terminal device comprises:

determining a relative position relationship between the first terminal device and the second terminal device based on the geographical position of the first terminal device and the geographical position of the second terminal device; and selecting the first transmission beam among N transmission beams between the first terminal device and the second terminal device based on the relative position relationship, wherein N is an integer greater than or equal to one;

wherein the relative position relationship between the first terminal device and the second terminal device is a reference connection line between the first terminal device and the second terminal device;

wherein the selecting the first transmission beam among the N transmission beams between the first terminal device and the second terminal device based on the relative position relationship comprises:

selecting, among the N transmission beams, a transmission beam having a minimum angle from the reference connection line as the first transmission beam based on the reference connection line; or selecting, among the N transmission beams, M transmission beams whose angles from the reference connection line are smaller than a preset angular threshold based on the reference connection line; and selecting, among the M transmission beams, a transmission beam with optimal quality as the first transmission beam, wherein M is an integer lower than or equal to N; or selecting, among the N transmission beams, M transmission beams whose angles from the reference connection line are smaller than a preset angular threshold based on the reference connection line; and selecting, among the M transmission beams, a transmission beam as the first transmission beam by polling in sequence at preset time intervals.

2. The method according to claim 1, wherein the preset angular threshold is preset or network-configured.

3. The method according to claim 1, wherein before the selecting a first transmission beam for transmitting data between the first terminal device and the second terminal device based on a geographical position of the first terminal device and a geographical position of the second terminal device, the method further comprises:

obtaining the geographical position of the second terminal device from broadcast information transmitted by the second terminal device.

4. A terminal device, comprising a processor, a transmitter and a memory for storing a computer program capable of being run by the processor, wherein the processor is configured to, when running the computer program:

select a first transmission beam for transmitting data to the second terminal device based on a geographical position of the terminal device and a geographical position of the second terminal device; and control the transmitter to transmit data to the second terminal device based on the first transmission beam;

wherein the processor is configured to: determine a relative position relationship between the terminal device and the second terminal device based on the geographical position of the terminal device and the geographical position of the second terminal device; and select the first transmission beam among N transmission beams between the terminal device and the second terminal device based on the relative position relationship, wherein N is an integer greater than or equal to one;

wherein the relative position relationship between the terminal device and the second terminal device is a reference connection line between the terminal device and the second terminal device;

wherein the processor is configured to: select, among the N transmission beams, a transmission beam having a minimum angle from the reference connection line as the first transmission beam based on the reference connection line; or wherein the processor is configured to select, among the N transmission beams, M transmission beams whose angles from the reference connection line are smaller than a preset angular threshold based on the reference connection line; and select, among the M transmission beams, a transmission beam with optimal quality as the first transmission beam, wherein M is an integer lower than or equal to N; or wherein the processor is configured to select, among the N transmission beams, M transmission beams whose angles from the reference connection line are smaller than a preset angular threshold based on the reference connection line; and select, among the M transmission beams, a transmission beam as the first transmission beam by polling in sequence at preset time intervals.

5. The terminal device according to claim 4, wherein the preset angular threshold is preset or network-configured.

6. The terminal device according to claim 4, wherein the processor is configured to obtain the geographical position of the second terminal device from broadcast information transmitted by the second terminal device.

7. A non-transitory computer storage medium, storing thereon computer-executable instructions which, when being executed, implement the steps of the method according to claim 1.

* * * * *